US006185617B1

(12) United States Patent
Housel, III et al.

(10) Patent No.: US 6,185,617 B1
(45) Date of Patent: Feb. 6, 2001

(54) CONSTRUCTION AND USAGE OF A PRE-WARMED CACHE FOR CLIENT-SERVER EMULATOR

(75) Inventors: Barron Cornelius Housel, III, Chapel Hill; Ian Beaumont Shields; Peter Williams Volkmar, both of Raleigh, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 08/979,574

(22) Filed: Nov. 26, 1997

(51) Int. Cl.[7] ............................. G06F 15/16; G06F 15/17
(52) U.S. Cl. ........................................ 709/227; 709/213
(58) Field of Search .................................... 709/227, 228, 709/203, 213, 230, 236, 205, 311; 370/235, 236, 466, 467, 389; 710/68, 73; 395/500.46, 500.48

(56) References Cited

U.S. PATENT DOCUMENTS

| | | | |
|---|---|---|---|
| 5,425,028 | * 6/1995 | Britton et al. ......................... | 370/389 |
| 5,544,320 | * 8/1996 | Konrad ................................. | 709/203 |
| 5,546,584 | * 8/1996 | Lundin et al. ........................ | 709/303 |
| 5,548,727 | * 8/1996 | Meehan ................................ | 709/221 |
| 5,652,908 | * 7/1997 | Douglas et al. ....................... | 714/4 |
| 5,754,774 | * 5/1998 | Bittinger et al. ..................... | 709/203 |
| 5,754,830 | * 5/1998 | Butts et al. .......................... | 709/311 |
| 5,787,470 | * 7/1998 | DeSimone et al. ................... | 711/124 |
| 5,907,678 | * 8/1999 | Housel, III et al. ................. | 709/213 |
| 5,931,913 | * 8/1999 | Meriwether et al. ................ | 709/227 |
| 5,935,212 | * 8/1999 | Kalajan et al. ...................... | 709/228 |

* cited by examiner

Primary Examiner—Mark H. Rinehart
Assistant Examiner—Farzaneh Farahi
(74) Attorney, Agent, or Firm—Edward H. Duffield; Felsman, Bradley, Vaden, Gunter & Dillon, LLP

(57) ABSTRACT

A method of communicating between computers, particularly between a host connected to a network server, and a workstation client running a terminal emulator. A pre-warmed cache is generated, containing information used in common by emulation programs on the client and server.

The pre-warmed cache can be loaded on the client, e.g., when establishing a session with the server. The pre-warmed cache may be generated by executing an application on the host, transmitting at least one terminal data stream associated with the application to the server (or to a second server configured substantially similar to the first server) and building a cache instance using one or more portions of the terminal data stream. A single pre-warmed cache can be provided for different hosts.

23 Claims, 3 Drawing Sheets

CONSTRUCTION AND USAGE OF A PRE-WARMED CACHE FOR CLIENT-SERVER EMULATOR

BACKGROUND OF THE INVENTION

1. Field of the Invention

The present invention generally relates to computer systems, and particularly to a method of providing data communications between different computers in a network, and still more particularly to a method of efficiently transmitting information between a workstation client running a terminal emulation program and a network server which is connected to a computer host, by initializing the client and server with a pre-warmed cache.

2. Description of the Related Art

Computer technology has progressed tremendously to the state where powerful desktop computers are available to the public at relatively low prices. Technological advancements in computer science have occurred swiftly considering that, only ten years or so ago, such powerful computers were confined to very expensive (and physically larger) mainframe computers and minicomputers. These early systems, which are still in use today, provide centralized processing of multiple computer programs ("applications") by a single mainframe host, with one or more "dumb" terminals connected to respective communication ports of the mainframe. This type of terminal does not perform any local processing; it simply allows the user to interface with the mainframe from a remote location, whether in a room next door, or in a distant building. The interface includes at least one user input device (e.g., a keyboard) and at least one user output device (e.g., a video monitor). The mainframe allocates its resources in a shared manner to process commands from the user input devices of all of the connected (and active) terminals, and transmits selective responses (control signals as well as user information) to the user output devices of the terminals. An example of such a terminal is the 3270 Information Display System sold by International Business Machines Corp. (IBM—assignee of the present invention).

These older systems represent a significant investment in hardware and specialized software, and provide a great deal of computing power, and further have lifetimes that may extend for more than another decade, so it is often desirable to continue to use these hosts. An example of such a system is the IBM AS/400 mid-range computing system. Users traditionally accessed the AS/400 system via terminals which were directly connected to and generally designed for the AS/400 system. However, in light of the proliferation of personal computers (PCs) at the workplace, businesses have expressed a desire to allow an existing PC to interface with these sorts of mainframes and minicomputers, i.e., to use the PC as a substitute for a terminal so that the latter equipment does not need to be purchased and maintained (as used herein, "PC" generally refers to any multi-purpose computer adapted for use by a single individual, regardless of the manufacturer, hardware platform, operating system, etc., and could further include stripped-down versions such as so-called network computers).

Accordingly, software programs have been devised which allow a more intelligent PC to mimic a dumb terminal. These programs are generally referred to as emulators, and give the user access to function keys and control sequences which the host applications normally use when communicating with an actual terminal. Three commonly emulated terminals are Digital Equipment Corp.'s VT100 terminal, IBM's 5250 terminal, and IBM's 3270 terminal. Different versions of these emulators are available for different types of PCs (e.g., IBM-compatible versus Macintosh).

Emulators frequently use an application protocol known as TELNET to allow a PC to access a remote host. TELNET relies on a set of communications protocols known as TCP/IP (Transmission Control Protocol/Internet Protocol) which can be used to link various kinds of computers over many different types of media such as the public Internet, private networks, or point-to-point modem communications. The Internet Protocol defines the unit of information to be transmitted across the medium, and provides the basis for "packet" delivery service. The Transmission Control Protocol provides a full duplex stream service allowing a process on one machine to send a stream of data to a process on another. Software implementing the TCP usually resides in the operating system and uses the IP to transmit information across the network. One specific protocol known as TN3270 allows a PC with a TCP/IP connection to negotiate a TELNET session emulating an IBM 3270 terminal; similarly, the TN5250 protocol is used for a TELNET session emulating an IBM 5250 terminal.

PCs have not only been adapted to interface with mainframe hosts by using emulators, but further have been adapted to interface with other PCs by using various communications methods and media to form different types of networks, such as a local area network (LAN). In addition to the PCs which act as workstation clients (the computers that are physically operated by the users), a network also typically has one or more PCs which operate as servers. A network server provides shared services to workstations, such as by supplying common application or data files, or by managing a network peripheral device like a printer or facsimile machine. A single physical PC can even be configured to operate as both a workstation and a server (simultaneously). As noted above, conventional networks often rely on the TCP/IP suite of protocols. Other protocols are also used, with each protocol being responsible for a different part of the communications function, such as the internetwork packet exchange (IPX), systems network architecture (SNA), binary synchronous communications (BISYNC), and asynchronous communications (ASYNC) protocols.

Some newer mainframes and mid-range computers (like IBM's System/370 host) support both a dumb terminal interface and "peer-to-peer" host/PC connectivity strategies (which are typically LAN-based) by providing workstation controllers or front-end processors. Older machines that lack peer-to-peer connectivity may still be incorporated into a client-server distributed environment by implementing terminal emulation in a hybrid system wherein a network "intercept" server is interconnected between an "intercept" client and a host, i.e., the server provides the interface to the host and acts as an intermediary to relay data or processes to and from the client/terminal.

In such a client-server-host system, a significant amount of the data volume from the host is repetitive, i.e., it represents information that has not changed from earlier host transmissions. Re-transmission of this unmodified data adversely affects overall performance of the network, since the information does not really need to be transmitted to the intercept client. Even if a cache or similar mechanism were integrated with the intercept client to locally provide such unmodified data, it would still take a relatively long period of time for a reasonable cache working set to be accumulated. Moreover, much of the information transmitted by the host is also redundant as between multiple intercept clients on the network (including clients having different associated intercept servers), so the performance penalty for building any local cache would be multiplied by the total number of end users, and could become very significant. It would, therefore, be desirable to devise a method of establishing a communications session between a client/terminal and a server/host which reduces performance delays associated with the transmission of information that often remains unmodified over long periods of time. It would be further advantageous if the method were easily extended to a server that provided connections to a plurality of hosts.

SUMMARY OF THE INVENTION

It is therefore one object of the present invention to provide an improved method of transmitting information between computers in a computer network.

It is another object of the present invention to provide such a method which is applicable to a communications link between a client and a server using a terminal emulator that runs in the client and communicates with a host that is connected to the server.

It is yet another object of the present invention to provide a method of efficiently establishing a plurality of communications sessions between a plurality of workstation clients and a given host.

The foregoing objects are achieved in a method of communicating between at least two computers, generally comprising the steps of generating a pre-warmed cache containing information used by a first program on a first computer, loading the pre-warmed cache on a second computer for use by a second program which is associated with the first program, and establishing a session between the first and second computers using the first and second programs. In an embodiment wherein the first computer is a network server connected to a host and the second computer is a workstation client connected across a communications link to the network server, the first and second programs are terminal emulation programs adapted to allow the workstation client to communicate with the host by emulating a terminal that is compatible with the host. The pre-warmed cache may be generated by executing an application on the host, transmitting at least one terminal data stream associated with the application from the host to the network server (or to a second server configured substantially similar to the first server), building a cache instance using one or more portions of the terminal data stream, and saving a copy of the cache instance as the pre-warmed cache. This procedure can be performed using a different workstation client acting as a partner terminal. Multiple sessions can be used to merge new information with a previously built pre-warmed cache. A single pre-warmed cache can further be used for different hosts. In this manner, a client which does not have a working cache (i.e., a new client or a client with an invalid cache) can immediately set up efficient communications with the server. The pre-warmed cache may be loaded, e.g., from a server to a client, or from a portable storage medium (like a floppy diskette) that can be installed onto the client or server.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

The present invention is directed to an improved method of transmitting information between computers in a computer network, and particularly between a workstation client running a terminal emulation program and a network server connected to a host that is compatible with the terminal emulation program. In a preferred embodiment, the terminal data stream from a host application is converted by a communications intercept at the server to a different communication format for transmission over a communication link to a communications intercept at the client, which converts the received information back to a terminal emulation protocol data stream that is passed to an emulation application. Information from the emulator can be transmitted back to the host along a similar communications path. One system for implementing such a communications path is provided by IBM's Emulator Express software package, although the present invention is not limited to that specific system.

The Emulator Express system synchronizes corresponding caches in the client and the server which are used to reduce the volume of session-related data required to be transmitted therebetween. This system further allows a cache instance constructed by the client during a previous session to be re-used as an initial cache instance for a new session on that client. Further details of the Emulator Express system are disclosed in U.S. patent application Ser. No. 08/852,586, entitled "Terminal Emulator Data Stream Differencing System," filed May 7, 1997, U.S. Pat. application Ser. No. 08/852,257, entitled "Persistent Cache Synchronization and Start Up System," filed May 7, 1997, U.S. patent application Ser. No. 08/852,585, entitled "Protocol Caching for Multiple Sessions Between a Single Client and Server," filed May 7, 1997, and U.S. patent application Ser. No. 08/852,461, entitled "Methods, Systems and Computer Program Products for Establishing a Session Between a Host and a Terminal Using a Reduced Protocol," filed May 7, 1997, each of which is hereby incorporated.

Figure 1:
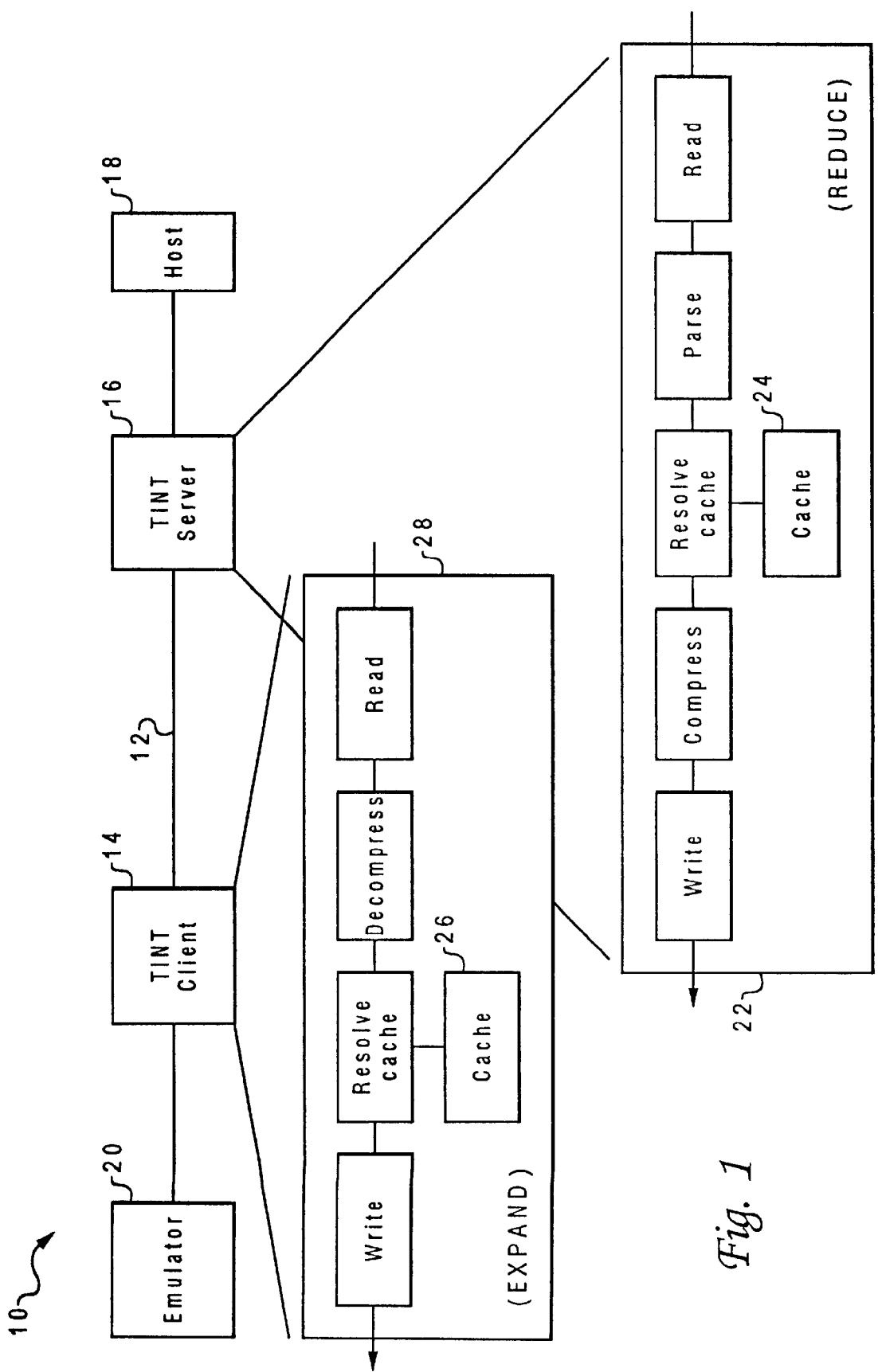
FIG. 1 is a block diagram illustrating one embodiment of a communications path according to the present invention, including a host computer, a server computer, and a client computer running a terminal emulation program.

With further reference to FIG. 1, an exemplary communications path 10 constructed in accordance with the present invention includes a communications link 12 which connects a workstation client 14 with a network server 16. Communications link 12 may be provided by, e.g., a local area network (LAN) which uses a TCP/IP connection. Those skilled in the art will appreciate, however, that the present invention is equally applicable to other types of computer networks and communications protocols.

Intercept server 16 is connected to a host 18 (e.g., mainframe or minicomputer) which is adapted to communicate with a plurality of terminals (not shown) to provide data processing services for many users. Host 18 could be connected to intercept server 16 indirectly via one or more intervening networks. Alternatively, intercept server 16 could be integrated into host 18. Host 18 is also adapted to communicate with one or more computers which emulate a terminal, such as intercept client 14 running an emulator 20. Intercept client 14 could be integrated into emulator 20. An exemplary host is IBM's AS/400 system using the TELNET protocol, for which emulator 20 uses the TN5250 communications protocol. Emulator 20 is not physical, but rather is a virtual terminal created by client 14.

Server 16 runs a program or TELNET interceptor (TINT) which intercepts and converts the terminal data stream from host 18 as indicated at 22. The data stream is first read and parsed, and then resolved for storage in a cache 24 located in server 16. Client 14 has a another cache 26 which corresponds to cache 24, such that a cache instance can be built in cache 26 which mirrors a cache instance in cache 24. Prior to the beginning of any session, cache 24 and cache 26 are empty, and the full data stream must be transmitted from server 16 to client 14 to build the cache instance. As the session progresses, however, it is not necessary to transmit the entire data stream since much of the information from host 18 corresponds to data that has already been stored in cache 26 and not modified. The TELNET interceptor may accordingly compress the data stream to remove the information that does not need to be transmitted, and write the compressed stream to communications link 12, so as to reduce the data volume actually transmitted across link 12.

Client 14 runs an associated TELNET interceptor which intercepts and converts this compressed stream as indicated at 28. The compressed stream is read and decompressed, and resolved for merger with data from cache 26. The expanded terminal emulation protocol data stream is then written to emulator 20. The data stream from client 14 may be likewise compressed for transmission to server 16, and the TELNET interceptor intercepts and appropriately modifies that compressed data stream for further transmission to host 18. Client 14 may be allowed to similarly communicate with a plurality of hosts by associating separate cache instances with given target hosts. At server 16, each cache instance is bound to a specific target host (and to a specific client since server 16 may provide services across the network to multiple workstations).

During a session, "checkpoints" are periodically taken. When a checkpoint is taken, consistent, synchronized copies of the active caches are made at the client and the server to form the next checkpoint. Starting with the latest checkpoint enables cached data to persist across sessions instances, thereby significantly reducing the volume of data that has to be transmitted over the relatively slow (e.g., modem or wireless) link between TINT client 14 and TINT server 16.

When client 14 initially establishes a session, there are no checkpoints, meaning that time penalties would be imposed on the user until a reasonable cache working set were accumulated in cache 24 and cache 26. If multiple clients are connected to the network, each client would similarly be required to build a separate cache instance. The present invention simplifies this process by allowing a client to use a pre-built (or "prewarmed") cache. A pre-warmed cache for a given target host (or set of target hosts) is built once, and thereafter replicated on any clients (and their respective servers) who are using the same host (or set of hosts). In this manner, a user can begin efficient operation immediately, that is, without requiring each user to manually exercise all applications running on the host, by simply initializing the emulation application with the pre-warmed cache. A pre-warmed cache on a server might be copied for another particular server but not for a client if they have different classes of machine architecture (e.g., Big Endian vs. Little Endian).

Creation of a pre-warmed cache (PWC) can be an administrator-friendly function that is seen as a minor extension to any current configuration. For example, a simple button labelled "Generate Pre-warmed Cache" may be included on the server configuration interface (e.g., a window displayed on the server's video monitor with various configuration options). Creation of a PWC can further be restricted to the server, i.e., under the exclusive control of an administrator and not allowed by any client. Since the PWC is ideally used by all emulation clients that connect to a given server, it may be undesirable to allow an individual client to create a PWC that is particularly optimized for his or her functional needs; in addition, this function adds complexity that is not appropriate for naive end-users. Nevertheless, the invention could be implemented to allow an individual user to construct the PWC.

Once a PWC for a given host is created, it is not necessary to maintain different instances of the PWC for each client that connects to the server since a single read-only copy can be used for all clients connecting to that host. However, it is possible to generate more than one PWC on a single server so that different user groups (e.g., departments, enterprises, etc.) can have separate PWCs and still run on the same emulation server.

The method of the present invention preferably allows a PWC to be generated from any user's existing cache (checkpoint), even if this was not planned in advance. For example, an early user may build up an effective cache during normal operation, from which a PWC can be created and replicated to other users. A PWC could further be provided on a suitable medium (e.g., a floppy diskette) such that an installation program can install it on the emulation client. Additionally, a PWC may be stored on the server and copied when the client is operatively connected to the server.

When a client connects to a server, instantiation of the PWC is preferably performed automatically (when necessary). Instantiating the PWC means that it is copied as the first (and only) checkpointed cache with appropriate control information to make it appear that a successful checkpoint was executed. Then, during normal connection establishment, this checkpoint can be copied to the active cache. In an alternative embodiment, the PWC could be copied directly to the active cache during session establishment. The PWC is enabled whenever it is determined during the connection protocol that there is no checkpointed cache (s) (such as the first time a client attempts to connect to its server), or if it is determined that the existing checkpointed cache is not valid (e.g., the administrator deleted a lot of server caches to clear disk space).

The present invention preferably further provides a means to verify that a PWC is still valid. An administrator may periodically create a new PWC, or the PWC on either the client or the server may became corrupted. In such a case, the client may be notified so that a fresh PWC can be installed. The protocol between the emulation client and emulation server during session establishment can exchange verification information (e.g., a time stamp) to insure that the respective client and server PWCs are consistent.

Figure 2:
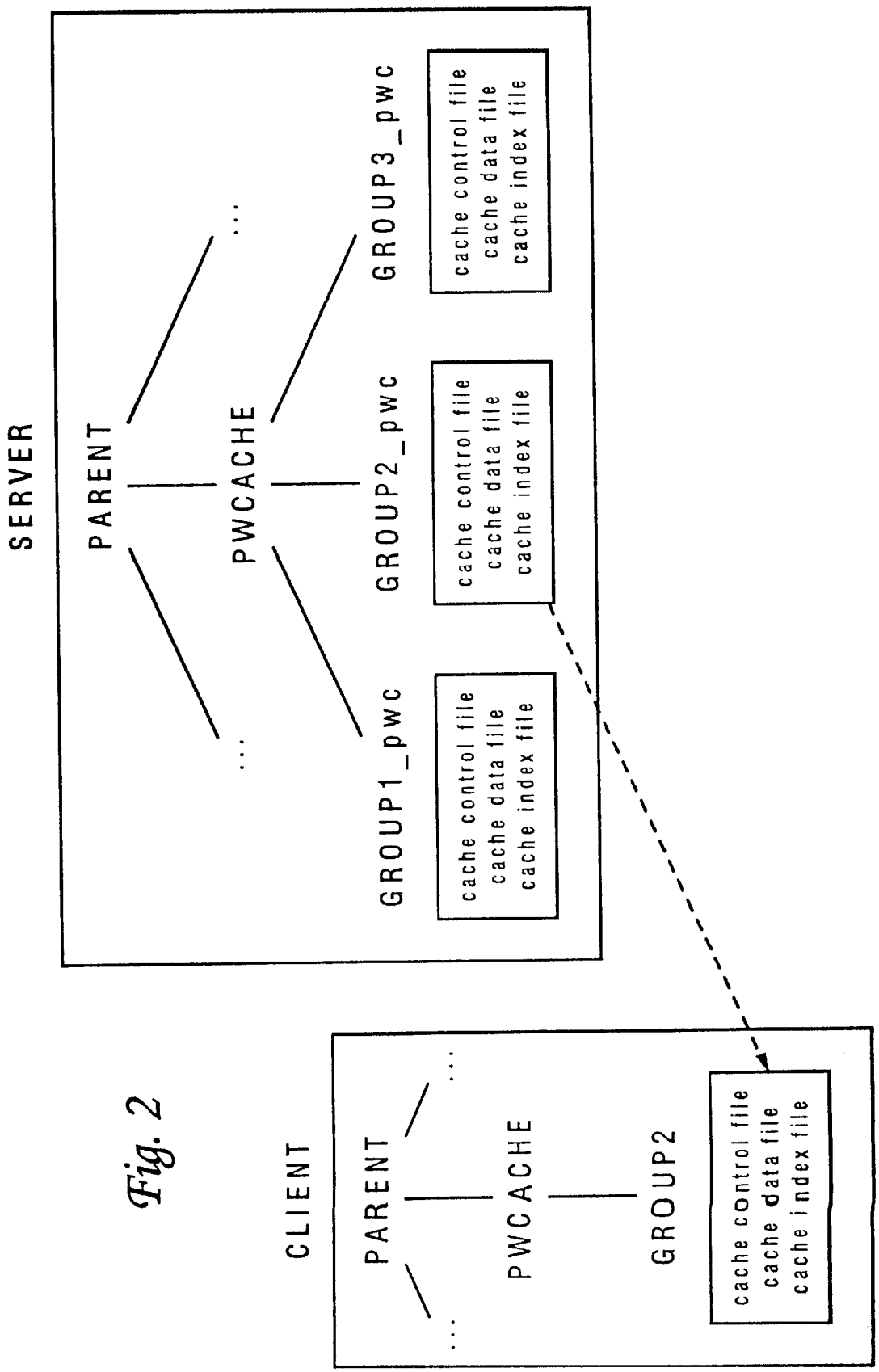
FIG. 2 is a conceptual diagram illustrating loading of a pre-warmed cache in a workstation client according to one implementation of the present invention.

One implementation of the present invention which supports the foregoing considerations is shown in FIG. 2.

A new directory "PWCACHE" is established on the server (under the parent directory) that is independent of any individual client directory. This directory has the structure "\PWCACHE\<pwc-name>\<file name>" where the PWCACHE directory is the root directory for all pre-warmed cache content, "<pwc-name>" is the name of a subdirectory that identifies a specific PWC (entered by the administrator), and "<file name>" denotes the name of various files used to apply the PWC. In this implementation, these files include a cache control file, a cache data file, and a cache index file. When a particular PWC is enabled, the corresponding files will be copied as the files used for the first checkpoint.

Figure 3:
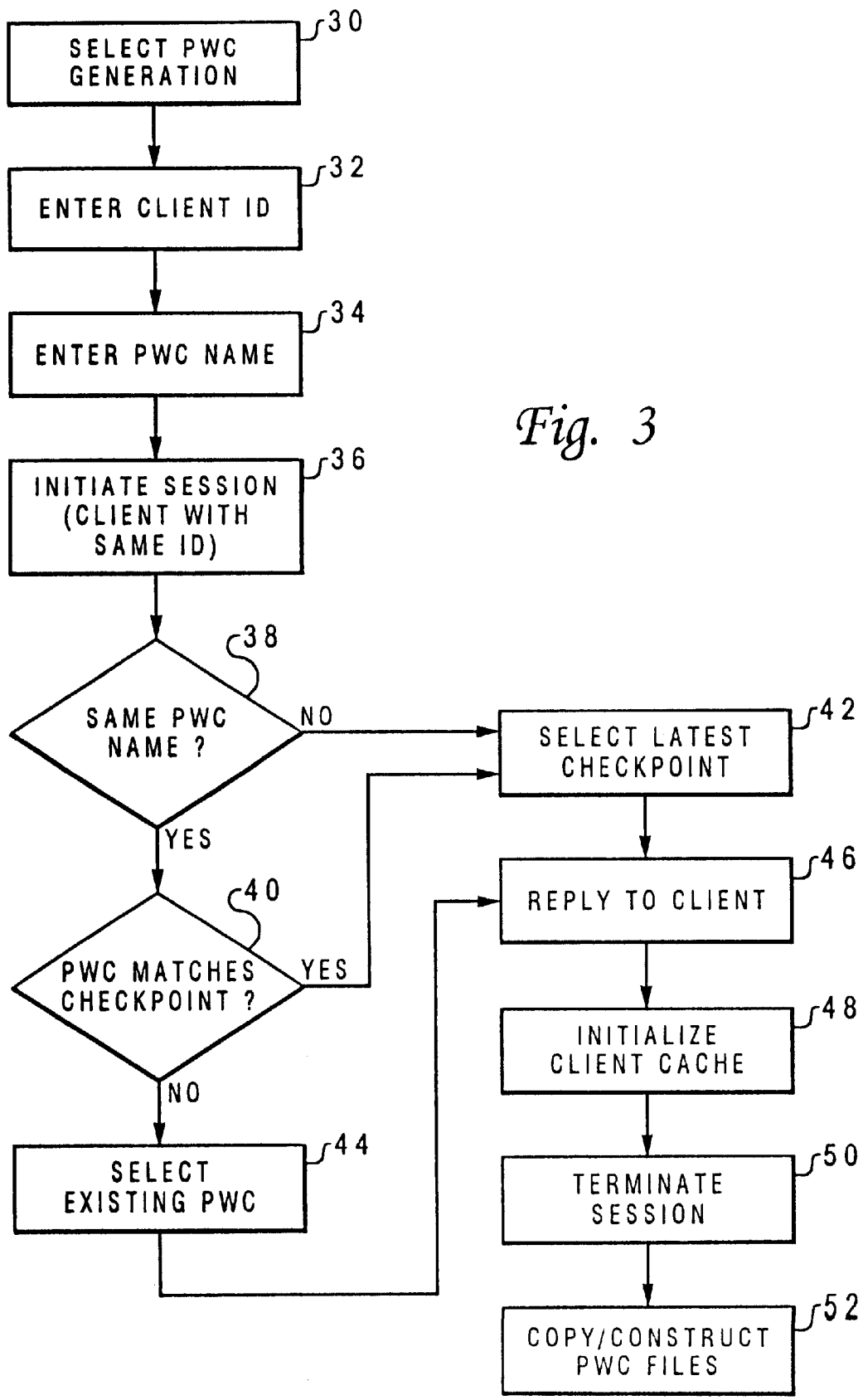
FIG. 3 is a chart illustrating the logic flow of one method in accordance with the present invention for constructing a pre-warmed cache.

One approach to creation and implementation of a PWC is shown in the flow chart of FIG. 3. The administrator selects "Generate Pre-Warmed Cache" from the server's configuration interface before any session is started (30). Remote administration can be accomplished using, e.g., a remote configuration function or TELNET to access the server configuration window. The administrator is then prompted to enter an identification number (ID) for an emulation client that will be serving as a partner in the PWC creation (32). During PWC generation, many clients may be using the server, so a client ID is used to differentiate the client participant in PWC generation from normal emulation clients that are using the same emulation server. The administrator can also enter a name for the PWC being created, or settle for a default name (34). PWC generation remains in effect until cancelled by the administrator (or until the emulation server is terminated). In this manner, the administrator can establish a series of different sessions with different hosts in order to construct a single PWC by caching additional data for different host applications.

PWC generation is enabled by an administrator at the server. When PWC is enabled, control information, containing the client ID and the PWC name, is used to signal the emulation server that PWC generation is active. The control information may take the form of, e.g., global variables or a file. During session startup, if the initiating client has the same ID as the PWC client ID (36), the server initializes PWC generation in one of two ways. If a PWC with the same name exists at the initiating client (38) and it is identical with the latest corresponding checkpoint (40), or if no PWC with the same name exists, then the latest checkpoint (42) is selected (this might be an empty cache if the named PWC does not exist). Alternatively, if a PWC with the same name exists but the latest checkpoint does not match the existing PWC, then all existing checkpoints are deleted and the PWC is selected as the new checkpoint (44). Accordingly, the PWC is mapped to the latest and only checkpoint and the cache control file is constructed to reflect the newly created checkpoint file. In either case, the emulation server sends a reply (46) to the initiating client providing the PWC name, a flag that PWC generation is enabled, and an indication of how to initialize (48) the client cache, i.e., use the selected checkpoint or use an existing PWC.

After successfully initializing PWC generation upon session startup, the administrator or user exercises the desired application(s), and then logs off the host. When the session is terminated (50), if the global flag indicates that PWC generation is in effect, the client and server copy the latest checkpoint to the named PWC (52). The data and index files are copied and a generic PWC control file is constructed that contains the correct time stamp reflecting when the checkpoint was created. The generated PWCs on the client and server are (logically) identical due to the prepare/commit logic of the checkpoint processing. The client and server PWC instances will have the same time-stamp because the server's checkpoint time-stamp is returned on the commit reply to the client's checkpoint request, and this time stamp is saved as the client's checkpoint timestamp (instead of the client's local checkpoint time). Thus, clock synchronization between client and server is not an issue.

The administrator may serially process more than a single session (with one host or different hosts). The processing described above is repeated for each subsequent session as long as PWC generation remains enabled. Since the initialization procedure guarantees that the PWC contents constructed for the previous session become the starting point for the next session, the PWC accumulates the union of data processed on all the sessions during the PWC generation.

Once the PWC is created and a copy exists on the emulation client(s) and server, a protocol is defined to use the PWC when either (a) no client or server checkpoints exist (i.e., a newly installed client), or (b) client and server checkpoints exist but (for whatever reason) they are not consistent. This protocol is referred to herein as PWC enablement. PWC enablement preferably is automatic and does not require extra steps. In one embodiment, PWC enablement begins on the client and proceeds to the server during connection establishment. Alternatively, PWC enablement can begin on a server and proceed to a client.

For client-side PWC enablement, when the emulation client attempts to establish a connection with its server, it normally selects the latest checkpoint, copies it to the active cache, and then sends the associated checkpoint ID and time-stamp to the server so that it can, in like manner, initialize an identical active cache. If there are no checkpointed caches, the client sends "0" to indicate starting with a null (empty) cache. The client determines if a PWCACHE directory exists; if it does, the client then tests the next level to see if a PWC subdirectory exists. If the subdirectory exists, the client then retrieves the PWC time from the control file saved under the PWC subdirectory and sends the PWC name and time-stamp to the emulation server in addition to the parameters for the selected checkpoint described above. This information gives the server the choice of using the existing checkpoint if it exists and is consistent, or using the PWC if there are no checkpoints or no consistent checkpoints. Ultimately, the client will receive a reply from the server to indicate the action to be taken: (a) use the existing checkpoint (preferred); (b) use the installed PWC; or (c) start with an empty cache. If (b) is chosen, the client loads the PWC as described previously and then selects the checkpoint to commence normal processing.

For server-side PWC enablement, during session startup, the server receives from the client the checkpoint ID of the client's selected checkpoint (0 if none exists), the time-stamp of the selected checkpoint, the PWC name, and the PWC creation time-stamp (0 if none exists). At this point the server must decide which action to take depending on whether PWC generation is in effect, whether or not there is an existing cache or PWC, etc. The detailed flow is illustrated by the pseudo code provided in the Appendix.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

APPENDIX

In the following "C." refers to data received from the client and "S." refers to server data. Explanatory notes are preceded by "//".

1. Begin
2. Receive session start-up request to get: {C.Checkpoint_ID, C.Checkpoint_Time, C.ClientID, C.pwcName, C.pwcTime}.

3. Derive S.pwcTime based on C.pwcName. (i.e., a search is done to determine if a prewarmed cache with the same name exists on the server. If it exists, its time is returned; otherwise, zero is returned.)
4. Initialize: reply to "Disagree" and preLoaded to "Not_Loaded".
5. If (no client cache exists (i.e., C.Checkpoint_ID EQ 0))

```
{
If ( (C.pwcTime EQ S.pwcTime) AND (S.pwcTime NE 0) )
    {
    C.Checkpoint_ID=LoadPrewarmCache (i.e., copy the
    PWC to reflect a checkpoint).
    set preLoaded to "Loaded".
    set S.Checkpoint_Time to S.pwcTime.
    set reply to "Agree_To_PWC."
    }
}
// make the checkpoint id the active cache if possible
6. S.Checkpoint_ID = selectCheckpoint(C.Checkpoint_ID);
7. If (preLoaded EQ "Not_Loaded")
{
If ( (S.Checkpoint_ID EQ C.Checkpoint_ID) AND
(C.Checkpoint_Time NE 0) )
    {
    set reply to "Agree".
    If( (GeneratePWC = True) AND (S.pwcTime NE
    S.Checkpoint_Time) AND (S.pwcTime NE 0) )
        {
        set reply="Agree_To_PWC."
        }
} Else  {
    If ( (C.pwcTime EQ S.pwcTime) AND (S.pwcTime NE
    0) )
    {
    set reply="Agree_To_PWC."
    }
    }
}
```

// At this point reply specifies to a) agree to use the selected checkpoint, b) agree to use the // prewarmed cache, or c) disagree to use either and start fresh 8. If (reply EQ "Agee_To_PWC") {Deselect the selected checkpoint if any. Load prewarm cache. Select the loaded checkpoint as the active cache. } Else { If(reply EQ "Disagree") { Delete all existing checkpoint files. } }
9. Initialize and open the cache.
10. Send reply, GeneratePWC, and name of prewarmed cache to client.
11. End

What is claimed is:

1. A method of communicating between at least two computers, comprising the steps of:
   generating a pre-warmed cache containing information used by a first program on a first computer;
   loading the pre-warmed cache on a second computer for use by a second program which is associated with the first program, said loading step occurring prior to any request for actual use of the information by the second program; and
   establishing a session between the first and second computers using the first and second programs.
2. The method of claim 1 further comprising the steps of:
   loading the pre-warmed cache on a third computer for use by a third program which is substantially similar to the second program and is also associated with the first program; and
   establishing a session between the first and third computers using the first and third programs.
3. The method of claim 1 further comprising the steps of:
   loading the pre-warmed cache on a third computer for use by a third program which is substantially similar to the second program;
   loading the pre-warmed cache on a fourth computer for use by a fourth program which is substantially similar to the first program and is associated with the third program; and
   establishing a session between the third computer and the fourth computer using the third program and the fourth program.
4. The method of claim 1 further comprising the steps of:
   compressing a data stream at the first computer to remove selected data which is also present in the pre-warmed cache at the second computer, thereby creating a compressed data stream;
   transmitting the compressed data stream to the second computer; and
   expanding the compressed data stream at the second computer to add the selected data from the pre-warmed cache.
5. The method of claim 1 wherein the first computer is a network server connected to a host, the second computer is a workstation client connected across a network to the network server, and the first and second programs are terminal emulation intercept programs adapted to allow the workstation client to communicate with the host by emulating a terminal compatible with the host, and further comprising the steps of:
   transmitting a terminal data stream in a first format from the host to the network server;
   converting the terminal data stream into a network data stream having a second format, using the first program;
   transmitting the network data stream from the network server to the workstation client; and
   converting the network data stream back into the terminal data stream at the workstation client, using the second program.
6. The method of claim 1 wherein said generating step includes the steps of:
   establishing a different session between a third computer and a fourth computer using a third program at the third computer and a fourth program at the fourth computer, wherein the third program is substantially similar to the first program, and the fourth program is substantially similar to the second program;
   transmitting at least one data stream from the third computer to the fourth computer during the different session, wherein the data stream includes information used by the third and fourth programs;
   building a cache instance using one or more portions of the data stream; and
   saving a copy of the cache instance as the pre-warmed cache.
7. The method of claim 1 further comprising the steps of:
   copying the pre-warmed cache to create a checkpoint at the second computer; and
   comparing the checkpoint at the second computer with a checkpoint at the first computer.
8. The method of claim 1 wherein said loading step is performed in response to said establishing step.
9. The method of claim 1 wherein the first computer is a network server connected to a host, the second computer is a workstation client connected across a network to the network server, the first and second programs are terminal emulation programs adapted to allow the workstation client to communicate with the host by emulating a terminal compatible with the host, and said generating step includes the steps of:

executing an application on the host;

transmitting at least one terminal data stream associated with the application, from the host to the network server;

building a cache instance using one or more portions of the terminal data stream; and saving a copy of the cache instance as the pre-warmed cache.

10. The method of claim 6 further comprising the step of terminating the different session between the third and fourth computers, and wherein said saving step is performed in response to said terminating step.

11. The method of claim 7 wherein:

the second computer has a previous checkpoint from an earlier session; and said copying step is performed in response to the further step of determining that the previous checkpoint is invalid.

12. The method of claim 8 wherein said loading step includes the step of copying the pre-warmed cache from the first computer to the second computer.

13. The method of claim 9 wherein the network server is connected to another host, and said generating step further includes the steps of:

executing another application on the other host;

transmitting at least one other terminal data stream associated with the other application, from the other host to the network server;

building another cache instance using one or more portions of the other terminal data stream; and merging the other cache instance with the pre-warmed cache.

14. A computer network comprising:

a plurality of computers, including at least a first computer having a first communications program, and a second computer having a second communications program which is associated with said first communications program;

a communications link for transmitting information between said first and second communications programs; and means for loading a pre-warmed cache on said second computer, said pre-warmed cache containing information used in common by said first and second communications programs, said loading means loading the pre-warmed cache on said second computer prior to any request for actual use of information contained in said pre-warmed cache by said second communications program.

15. The computer network of claim 14 wherein:

said plurality of computers further includes a third computer having a third communications program which is substantially similar to said second communications program and is also associated with said first communications program;

said communications link is further for transmitting information between said first and third communications programs;

said pre-warmed cache is a first pre-warmed cache containing a first set of information; and said loading means is further for loading a second pre-warmed cache on said third computer, said second pre-warmed cache containing a second set of information used in common by said first and third communications programs.

16. The computer network of claim 14 wherein:

said plurality of computers further includes a third computer having a third communications program which is substantially similar to said second communications program and is also associated with said first communications program;

said communications link is further for transmitting information between said first and third communications programs; and said loading means is further for loading said pre-warmed cache on said third computer.

17. The computer network of claim 14 wherein:

said first communications program includes means for compressing a data stream at said first computer to remove selected data which is also present in said pre-warmed cache at said second computer, thereby creating a compressed data stream; and said second communications program includes means for expanding said compressed data stream at said second computer to add said selected data from said pre-warmed cache.

18. The computer network of claim 14 further comprising a host, wherein:

said first computer is a network server connected to said host;

said second computer is a workstation client; and said first and second communications programs are terminal emulation programs adapted to allow said workstation client to communicate with said host by emulating a terminal compatible with said host.

19. The computer network of claim 14 further comprising means for generating said pre-warmed cache.

20. The computer network of claim 14 further comprising:

means for using said pre-warmed cache to create a checkpoint at said second computer; and means for comparing said checkpoint at said second computer with a checkpoint at said first computer.

21. The computer network of claim 14 wherein said loading means loads said pre-warmed cache in response to said first and second communications programs establishing a session.

22. The computer network of claim 19 wherein said generating means includes:

a third computer having a third communications program which is substantially similar to said second communications program and is also associated with said first communications program; and means for building a cache instance using one or more portions of a data stream transmitted from said first communications program to said third communications program.

23. The computer network of claim 22 further comprising a host, wherein:

said first computer is a network server connected to said host;

said second computer is a first workstation client;

said third computer is a second workstation client;

said second communications program is a first terminal emulation program adapted to allow said first workstation client to emulate a terminal compatible with said host;

said third communications program is a second terminal emulation program, substantially similar to said first terminal emulation program, adapted to allow said second workstation client to emulate a terminal compatible with said host; and said first communications program is adapted to allow said first and second terminal emulation programs to conduct sessions with said host.

* * * * *